March 14, 1967 — S. KATZ ETAL — 3,308,550
ANGULAR DISPLACEMENT SENSOR
Filed Nov. 23, 1964

INVENTORS
SILAS KATZ
EDWARD T. WINSTON
BY Harry M. Saragovitz,
Edward J. Kelly, Herbert Berl
& J. D. Edgerton
ATTORNEYS United States Patent Office 3,308,550
Patented Mar. 14, 1967

3,308,550
ANGULAR DISPLACEMENT SENSOR
Silas Katz, Silver Spring, Md., and Edward T. Winston, Falls Church, Va., assignors to the United States of America as represented by the Secretary of the Army
Filed Nov. 23, 1964, Ser. No. 413,380
1 Claim. (Cl. 33—206)

This invention relates to an angular displacement sensor. More particularly, this invention relates to a means for determining movement from a normal plane depending upon convection currents and gravitational fields.

Prior art devices are available for determining angular displacement from a normal plane. However, most of these devices are extremely complex and expensive, particularly when they are of a constant moving type, such as gyroscopes and the like. In the particular field of technology with which this invention pertains, little or nothing has been accomplished utilizing convection currents set up by heat means in order to determine angular displacement.

Accordingly, it is an object of the present invention to provide an angular displacement sensor.

It is another object of the present invention to provide an angular displacement sensor utilizing well known convection current principles.

It is yet another object of the present invention to provide an angular displacement sensor constructed of relatively inexpensive material and being quite efficient in function.

Additional objects and advantages of the present invention will become apparent upon detailed consideration of the material provided below taken in conjunction with the drawings, wherein.

Figure 1:
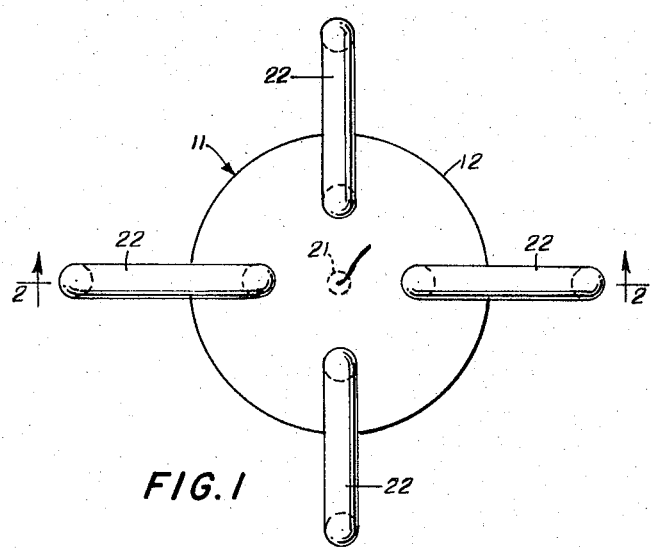
FIGURE 1 is a top plan view of the device of the present invention.
Figure 2:
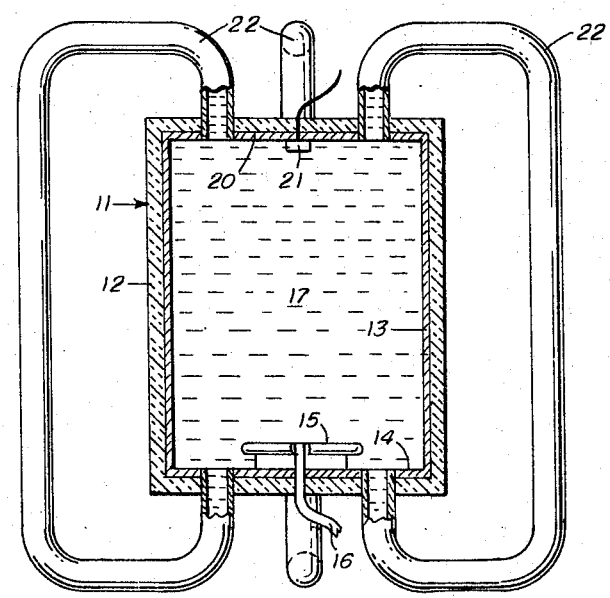
FIGURE 2 is a side elevation showing a portion in cross-section.

Attention is directed to FIGURE 2 wherein a housing, shown, generally, by reference numeral 11, contains a fluid which may be gas or a liquid. The housing 11 has an inner shell 13 of metal, which should be of a fairly non-deteriorating metal and should be insulated by an outer layer 12. The housing 11, in order to function most efficiently, should be circular in nature with its axis running generally vertically, i.e., perpendicular to the prevailing gravitational forces.

In spaced relationship to the bottom 14 is a heating element 15 which may be constructed of any suitable material, preferably an electric resistance means. The heating element is connected by means of lead lines 16 to a suitable electric power source, not shown.

When the heating source is energized, the fluid 17 in the housing 11 is heated, as is to be expected. It will be appreciated that the fluid directly in association with the heating element 15 is the first portion to be heated. As is well known, fluids which are heated experience a decrease in density so that they rise away from the heating source to an opposite pole from the heating source. As the fluid is heated, and as it rises away from the heating element 15, the cooler fluid at the sides of the heating element flows inwardly to replace the heated fluid.

In the present instance, it will be seen that the heated fluid will rise upwardly until it reaches the top 20 of the housing 11. As this is accomplished, the heated fluid will strike the heat sensitive element 21 which, in the present case, is one leg of a Wheatstone bridge. As the heat sensitive element 21 is heated, it will show, through appropriate circuitry, an increase in temperature. By controlling the output of the heating element 15 to a constant and by maintaining the entire unit of the present invention under constant ambient conditions, a level of equilibrium will be reached whereby the temperature sensed by the heat sensitive element 21 will register a temperature gradient without deviation.

Figure 3:
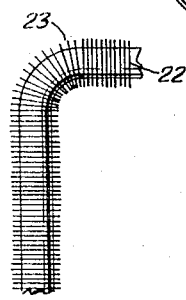
FIGURE 3 is a fragmentary portion of one of the legs utilized in the present invention.

As the heated fluid strikes the top 20, it will naturally move radially towards a plurality of return legs 22, positioned at 90 degree angles from each other. The heated fluid will dissipate its heat in the legs due to suitable radial fins 23, as shown in FIGURE 3. The cooled fluid will then descend in the leg to return to the bottom 14 of the housing 11 in order to replenish the displaced fluid. As was stated in the above, to properly calibrate the device, a degree of equilibrium must be achieved so that no variance in the temperature gradient will be noticed. However, as the device of the present invention is moved through an acute angle, the vertical axis of the device will remain the same, but an acute angle will be generated between said axis and the plane perpendicular to the gravitational force. Consequently, the heated fluid, as it rises along the plane perpendicular to the gravitational forces, no longer directly strikes the heat sensitive element 21 but strikes some point along the top 20 of the housing 11. It will be appreciated that no longer is the heat sensitive element subjected to a direct interchange with the heated fluid, but some of it is deflected directly into the legs 22, thereby the heat sensitive element will register a decrease in temperature. The variation between the constant temperature achieved originally and the resulting change will be a measure of the angular displacement.

Figure 4:
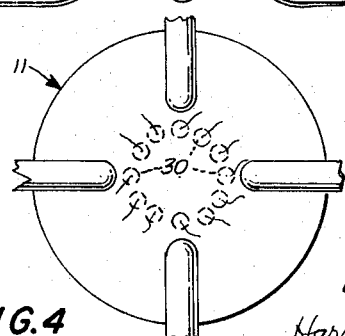
FIGURE 4 is a top plan view in fragment, showing a modification of the present invention.

In the foregoing, a single heat sensitive element 21 was utilized. However, a deficiency in this arrangement will become apparent in that no reading can be obtained as to the linear direction in which the angular displacement has occurred. In order to correct this and to give an indication of the direction, the modification shown in FIGURE 4 utilizes a plurality of heat sensitive elements 30, distributed concentrically about the axis of the device and all equi-distant from said axis. Each heat sensitive element 30 is a part of a separate Wheatstone bridge and constitutes a leg thereof. In the modification, as the device is moved through an acute angle, it will be appreciated that some of the heat sensitive elements 30 will be subjected to greater heating conditions, while the oppositely disposed heat sensitive elements 30, at 180 degrees on the other side, will be cooler. In this manner, a suitable reading may be obtained, not only of the degree of angula displacement, but of the actual direction of displacement.

In yet another modification of the present invention, the arrangement shown in FIGURE 2 is utilized, but additional heat sensitive elements are positioned in each of the four legs 22. In this manner, all four heat sensitive elements in the legs 22 will register a like temperature at equilibrium when the device has its axis in a plane perpendicular to the gravitational forces. When the device is moved through an acute angle, the temperature conditions in the legs will become unbalanced and obviously be different as more of the heated fluid flows through one of the legs as opposed to one of the other legs.

While, in the above, the term "fluid" has been employed generically, it has been found that liquids such as water will be preferred due to the higher heat content and greater convection flow characteristics.

The device of the present invention will find useful application in any environment having either a natural or artificial gravitational field. Consequently, the device will find use in controlling missiles which may operate through artificial gravitational fields or natural gravitational fields depending upon their flight characteristics. The device also has the advantage that it may be remotely operated and controlled, providing easy telemetering over great distances.

It will be apparent that many changes and modifications of the several features described herein may be made without departing from the spirit and scope of the invention. It is, therefore, apparent that the foregoing description is by way of illustration of the invention rather than limitation of the invention.

What is claimed is:

An angular displacement sensor comprising:
 (a) a vertical cylindrical housing having a top and a bottom and filled with a fluid,
 (b) thermal insulating means surrounding said vertical housing,
 (c) said housing having an electric heating means near said bottom at the center of said bottom,
 (d) a plurality of heat sensitive means positioned in a circle at said top of said housing with the center of said top being the center of said circle,
 (e) at least four recycle conduits on the outside of said housing each having one end opening into the top of said housing and the other end opening into the bottom of said housing, the ends opening into the top of said housing being equally spaced on a circle concentric with and larger than the circle on which the heat sensitive means are positioned,
 (f) a plurality of radial fins surrounding each of said recycle conduits,
 (g) the ends of said recycle conduits opening into the bottom of said housing surrounding said heating means.

References Cited by the Examiner

UNITED STATES PATENTS

| | | | |
|---|---|---|---|
| 1,614,250 | 1/1927 | Moody | 165—106 |
| 1,887,569 | 11/1932 | Palley | 165—106 X |
| 2,620,571 | 12/1952 | Varian | 33—206 |

LEONARD FORMAN, *Primary Examiner.*

L. ANDERSON, *Assistant Examiner.*